United States Patent
Andersson et al.

(10) Patent No.: US 9,967,768 B2
(45) Date of Patent: May 8, 2018

(54) APPARATUS AND METHOD RELATING TO THE STREAMING OF CONTENT TO ONE OR MORE USER DEVICES

(71) Applicant: TELEFONAKTIEBOLAGET L M ERICSSON (PUBL), Stockholm (SE)

(72) Inventors: Ola Andersson, Spånga (SE); Robert Skog, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 36 days.

(21) Appl. No.: 14/432,371

(22) PCT Filed: Oct. 1, 2012

(86) PCT No.: PCT/EP2012/069356
§ 371 (c)(1),
(2) Date: Mar. 30, 2015

(87) PCT Pub. No.: WO2014/053160
PCT Pub. Date: Apr. 10, 2014

(65) Prior Publication Data
US 2015/0282000 A1   Oct. 1, 2015

(51) Int. Cl.
*H04W 28/02* (2009.01)
*H04L 29/06* (2006.01)
(Continued)

(52) U.S. Cl.
CPC ..... *H04W 28/0268* (2013.01); *H04L 65/4084* (2013.01); *H04L 65/4092* (2013.01);
(Continued)

(58) Field of Classification Search
None
See application file for complete search history.

(56) References Cited

U.S. PATENT DOCUMENTS

2005/0033879 A1    2/2005   Hwang et al.
2007/0286213 A1*  12/2007   Fodor ................. H04L 12/5695
                                                   370/401
(Continued)

FOREIGN PATENT DOCUMENTS

CN    1299508 C      2/2007
CN    102547388 A    7/2012
(Continued)

OTHER PUBLICATIONS

Adams, M., "Improving fairness in HTTP adaptive streaming," Retrieved (Mar. 19, 2015) http://www.v-net.tv/improving-fairness-in-http-adaptive-streaming/, 3 pages.
(Continued)

*Primary Examiner* — Benjamin Lamont
(74) *Attorney, Agent, or Firm* — Rothwell, Figg, Ernst & Manbeck, p.c.

(57) ABSTRACT

The embodiments relate to an apparatus and method for streaming content to one or more user equipment devices in a telecommunications network, wherein the content is available for streaming at one of a plurality of different quality representations. The method comprises the step of receiving a request from a user equipment device, wherein the request is for delivery of a segment of the content at a first quality representation. It is determined whether the user equipment device is connected to a cell of the telecommunications network in which a congestion level of the cell is above a threshold level. If so, a fairness function is performed to determine if the segment of content should be streamed to the user equipment device at the requested first quality representation or a second quality representation. The segment of content is streamed to the user equipment device at the first quality representation or the second quality repre-
(Continued)

sentation based on a result of performing the fairness function.

16 Claims, 5 Drawing Sheets

(51) Int. Cl.
　　　H04W 28/20　　(2009.01)
　　　H04W 28/24　　(2009.01)
　　　H04W 72/08　　(2009.01)
(52) U.S. Cl.
　　　CPC ............ *H04L 65/602* (2013.01); *H04L 65/80* (2013.01); *H04W 28/0231* (2013.01); *H04W 28/0289* (2013.01); *H04W 28/20* (2013.01); *H04W 28/24* (2013.01); *H04W 72/085* (2013.01); *H04W 72/087* (2013.01)

(56) References Cited

U.S. PATENT DOCUMENTS

| | | | |
|---|---|---|---|
| 2008/0076457 A1* | 3/2008 | Kim | H04W 4/12 455/466 |
| 2011/0082924 A1* | 4/2011 | Gopalakrishnan | H04L 65/4084 709/223 |
| 2011/0170408 A1* | 7/2011 | Furbeck | H04L 47/10 370/230 |
| 2012/0005361 A1* | 1/2012 | Knittle | H04L 12/66 709/231 |
| 2012/0084454 A1* | 4/2012 | Lindquist | H04N 7/17318 709/231 |
| 2012/0163203 A1* | 6/2012 | Wilkinson | H04L 41/5025 370/252 |
| 2012/0191805 A1* | 7/2012 | Fee | H04N 21/2343 709/217 |
| 2012/0269110 A1* | 10/2012 | Walker | H04W 28/16 370/312 |
| 2013/0013799 A1* | 1/2013 | Keum | H04L 65/4076 709/231 |
| 2013/0132986 A1* | 5/2013 | Mack | H04L 65/605 725/14 |
| 2013/0179589 A1* | 7/2013 | McCarthy | H04N 21/8456 709/231 |
| 2013/0191508 A1* | 7/2013 | Strasman | H04N 21/2385 709/219 |
| 2013/0232534 A1* | 9/2013 | Salkintzis | H04W 76/026 725/116 |
| 2013/0291002 A1* | 10/2013 | Rothschild | H04N 21/258 725/25 |
| 2013/0326024 A1* | 12/2013 | Chen | H04L 65/4084 709/219 |
| 2014/0040498 A1* | 2/2014 | Oyman | H04W 24/04 709/231 |
| 2014/0258552 A1* | 9/2014 | Oyman | H04N 19/146 709/231 |

FOREIGN PATENT DOCUMENTS

| | | |
|---|---|---|
| EP | 2472946 A1 | 7/2012 |
| WO | 2004039034 A1 | 5/2004 |
| WO | 2009032214 A2 | 3/2009 |
| WO | 2011109101 A1 | 9/2011 |

OTHER PUBLICATIONS

English translation of Chinese Office Action dated Mar. 3, 2017 in corresponding Chinese Application No. 201280077442.5, 16 pages.
English translation of Chinese Search Report dated Feb. 22, 2017 in corresponding Chinese Application No. 2012850077442.5, 2 pages.
Chinese Office Action dated Mar. 3, 2017 in corresponding Chinese Application No. 2012800774425, 9 pages.
Chinese Search Report dated Feb. 22, 2017 in corresponding Chinese Application No. 2012800774425, 2 pages.

* cited by examiner

APPARATUS AND METHOD RELATING TO THE STREAMING OF CONTENT TO ONE OR MORE USER DEVICES

CROSS REFERENCE TO RELATED APPLICATION(S)

This application is a 35 U.S.C. § 371 National Phase Entry Application from PCT/EP2012/069356, filed Oct. 1, 2012, designating the United States, the disclosure of which is incorporated herein in its entirety by reference.

TECHNICAL FIELD

The present invention relates to an apparatus and method relating to the streaming of content to one or more user devices, for example when using adaptive HTTP streaming techniques.

BACKGROUND

Figure 1:
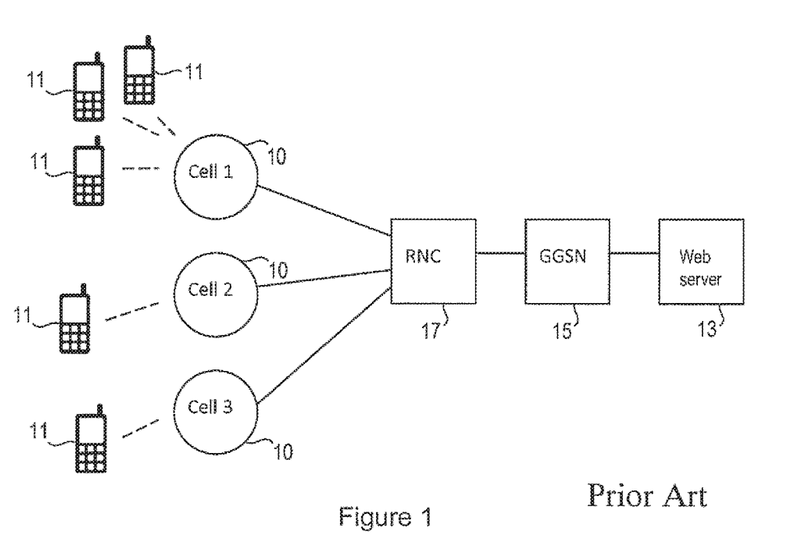
FIG. 1 shows a typical network for streaming content to multiple user equipment devices.

Adaptive HTTP streaming (AHS) techniques are becoming more and more popular for providing video services. The adaptive HTTP streaming technique supports both video-on-demand and live video. Unicast transmission is typically used as default as a transport bearer. However, media segments can also be broadcasted to multiple receivers in a cell, for example using the broadcast mechanism in the Long Term Evolution (LTE) standard. FIG. 1 shows a typical network in which content or media from a web server 13 is streamed to a plurality of user equipment devices 11. The content is streamed via cells 10 associated with the user equipment devices 11, under control of a radio network controller 17. The web server 13 typically streams the content to the radio network controller via one or more nodes of a telecommunication network, such as a Gateway GPRS Support Node (GGSN) 15.

Adaptive HTTP streaming is a transport technique that uses existing file formats such as the Base Media File Format of the International Organization for Standardization (ISO BMFF) or the MPEG2-TS standard of the Moving Picture Experts Group. Different audio and video codecs are supported such as H.264, MPEG4, Advanced Audio Coding (AAC), mp3 codecs.

A number of different adaptive HTTP streaming solutions exist, such as HTTP Live Streaming (HLS) by Apple®, SmoothStreaming (ISM) from Microsoft®, 3GP Dynamic Adaptive Streaming over HTTP (3GP-DASH), MPEG Dynamic Adaptive Streaming over HTTP (MPEG-DASH), OITV HTTP Adaptive Streaming (OITV-HAS) of the Open IPTV Forum, Dynamic Streaming by Adobe® and many more. There is a possibility that the MPEG DASH solution will become the dominating standard for adaptive HTTP streaming.

The adaptive HTTP streaming techniques rely on the client to select the media quality. The server or content provider uses a "manifest file" to describe all of the different quality representations (media bitrates) that are available for streaming a particular content or media, and how these different quality representations can be accessed from the server. The manifest file is fetched at least once at the beginning of the streaming session and may be updated. In the case of the HLS technique by Apple®, the manifest is formatted as a Playlist file in the m3u8 format. In the case of 3GP/MPEG DASH, the manifest is an XML structure called the Media Presentation Description (MPD).

Most of the adaptive HTTP streaming techniques require a client to continuously fetch media segments from a server. A certain amount of media time (e.g. 10 sec of media data) is contained in a typical media segment. The creation of the addresses or URIs for downloading the segments of the different quality representation is described in the manifest file.

Figure 2:
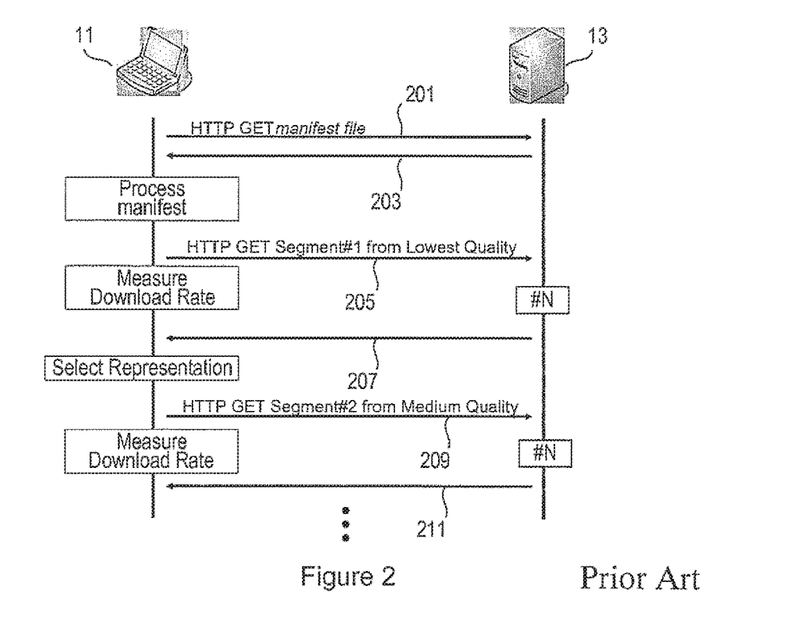
FIG. 2 shows a typical messaging sequence relating to adaptive HTTP streaming.

FIG. 2 depicts the basic principle of how segments may be fetched by an user equipment device 11, using an adapting HTTP streaming technique, from a server node 13. In steps 201 and 203 the user equipment device 11 fetches a manifest file from the server node 13. The user equipment device 11 processes the manifest file, and in step 205 fetches a first segment at a particular quality level, for example having the lowest quality level to begin with. The segment is fetched using a HTTP GET message. The user equipment 11 continuously measures the link bit-rate while receiving the media segments, for example while the first segment is being downloaded in step 207. Using this information about the link bit-rate the user equipment 11 is able to select a different representation or quality level, and sends a "HTTP GET Segment#2 from Medium Quality" message to the server node 13, shown in step 209. Upon receipt of the request, the server node 13 streams a segment at the medium quality level, step 211. The user equipment 11 may change to another quality representation at any time. For example, MPEG-DASH has defined a new indexing box, which allows user equipment devices to efficiently switch quality even in the middle of a segment download.

From the above it can be seen that, in adapting HTTP streaming, a video is encoded with multiple discrete bitrates and each bitrate stream is broken into multiple segments or "chunks" (for example 1-10 second segments). The $i^{th}$ chunk from one bitrate stream is aligned in the video time line to the $i^{th}$ chunk from another bitrate stream so that a user equipment device (or client device), such as a video player, can smoothly switch to a different bitrate at each chunk boundary.

The DASH "on-Demand" profile, which is promoted and used by applications such as NetFlix® follows a different scheme. The On-Demand profile is very close to HTTP progressive streaming, with the difference that the client may change the quality during playback.

In the case of the DASH "On-Demand" profile, the client requests video content using an open-range byte range request with HTTP. The client keeps receiving video content on the same HTTP pipe. Only in the case of quality switching, the client terminates the TCP connection and opens a new TCP connection for the next range request.

Either MPEG2-TS or ISO BMFF may be used as a file format for the media segments. MPEG2-TS is commonly known from the TV Broadcast environment. Other techniques such as HLS use MPEG2-TS. The Smooth Streaming technique by Microsoft uses Fragmented MP4 Files, which is defined as part of ISO BMFF. MPEG-DASH allows both ISO BMFF and MPEG2-TS as media segments. Additional ISO BMFF structures are defined to increase the robustness and feature-richness of DASH. 3GP-DASH is a profile of MPEG-DASH. A major difference is that only ISO BMFF is allowed. OIPF HAS (HTTP Adaptive Streaming) is also a profile of MPEG-DASH, supporting both ISO BMFF and MPEG2-TS file formats for media segments.

As mentioned above, adaptive HTTP streaming such as DASH or HLS is based on bitrate decisions made by user equipment devices. The user equipment device measures its own link bitrate and decides on the bitrate it would prefer for downloading content, typically selecting the highest available content bitrate that it predicts the available bandwidth can cater for.

When multiple user equipment devices are using an adaptive HTTP streaming service on the same network the bandwidth is often unfairly distributed among the user equipment devices, which can lead to unfairness.

For example, when multiple user equipment devices are using an adaptive HTTP streaming service on the same network they all compete over the available bandwidth (link throughput). If a user equipment device is fortunate enough to obtain a large share of the link bandwidth, that user equipment device will continue to experience rapid segment downloads and so continue to request a higher profile with larger segments. However, a user equipment device that only manages to obtain a smaller proportion of link throughput experiences a slower segment download and then is forced to request a lower rate profile with smaller segments.

The consequence of this is that adapting HTP streaming techniques are inherently unfair. Clients or user equipment devices that have been fortunate enough to get hold of a large chunk of the link throughput do not let it go, thus the unlucky user equipment devices tend to stay unlucky for the entire service session. This problem is particularly true in mobile/radio networks such as that shown in FIG. 1, where one or more cells can be congested. For service providers this is a problematic scenario, since having some of the end-users receiving poor quality downloads during an entire session results in a high risk that such end-users may stop using that service provider. A much better scenario would be if all end-users receive the same quality, even though this quality will be at a slightly lower quality than normal for some of the end-users.

A number of mechanisms exist for solving the unfairness problem in adapting HTTP streaming, for example in the form of various network solutions where network queuing schedulers or other control nodes are introduced in the network. Such mechanisms solve the problem using queuing mechanisms and scheduling how available bandwidth is shared between end-users. However, such systems have the disadvantage of requiring the network to be modified, which can be a hurdle for a service provider that is not in control of the network.

SUMMARY

It is an aim of the present invention to provide a method and apparatus which obviate or reduce at least one or more of the disadvantages mentioned above.

According to a first aspect of the invention there is provided a method for streaming content to one or more user equipment devices in a telecommunications network, wherein the content is available for streaming at one of a plurality of different quality representations. The method comprises the step of receiving a request from a user equipment device, wherein the request is for delivery of a segment of the content at a first quality representation. It is determined whether the user equipment device is connected to a cell of the telecommunications network in which a congestion level of the cell is above a threshold level. If so, a fairness function is performed to determine if the segment of content should be streamed to the user equipment device at the requested first quality representation or a second quality representation. The segment of content is streamed to the user equipment device at the first quality representation or the second quality representation based on a result of performing the fairness function.

By determining if a request is from a user equipment device located in a congested cell, the method is able to perform an additional check before streaming the content to the user equipment device, this additional check being the fairness function. This has the advantage of streaming content more fairly to user equipment devices within congested cells.

According to another aspect of the invention there is provided an apparatus for streaming content to one or more user equipment devices in a telecommunications network, wherein the content is available for streaming at one of a plurality of different quality representations. The apparatus comprises a receiving unit configured to receive a request from a user equipment device, wherein the request is for delivery of a segment of the content at a first quality representation. A processing unit is adapted to determining whether the user equipment device is connected to a cell of the telecommunications network in which a congestion level of the cell is above a threshold level, and, if so, perform a fairness function to determine if the segment of content should be streamed to the user equipment device at the requested first quality representation or a second quality representation. A transmitting unit is configured to stream the segment of content to the user equipment device at the first quality representation or the second quality representation based on a result of the fairness function.

According to another aspect of the invention, there is provided a user equipment device for receiving content from a node of a telecommunications network, wherein the content is available for streaming from the node at one of a plurality of different quality representations. The user equipment device comprises a transmitting unit adapted to transmit a request for receipt of a segment of the content at a first quality representation. A receiving unit is adapted to receive an information signal from the node, wherein the information signal contains an indicator that the requested segment of content is being received at a different quality representation to that requested. A processing unit is adapted to adjust the operation of the user equipment device to receive the segment of content at the second quality representation.

BRIEF DESCRIPTION OF THE DRAWINGS

For a better understanding of the present invention, and to show more clearly how it may be carried into effect, reference will now be made, by way of example only, to the following drawings in which.

DETAILED DESCRIPTION

The embodiments of the present invention, as described below, are based on introducing an additional function into an adapting HTTP streaming (AHS) service, herein termed a "Fairness Function (FF)". It is noted, however, that the invention is intended to embrace other streaming methods other than the adaptive HTTP streaming technique, i.e. other streaming methods where requests for segments of content are made in a congested or crowded cell.

It is noted that the fairness function can be placed either on the same server that serves the segments of content, for example a web server that serves video segments, or in another node associated with the streaming of content, for example in a node placed directly in front of a server, or between a server node and user equipment devices.

The Fairness Function is performed on requests, such as adapting HTTP service requests, that are received from user equipment devices (or client devices) that are associated with congested cells, and makes a judgment about whether a particular user equipment device shall receive the requested video quality or a lower quality in order to make it fair to other clients.

Figure 3:
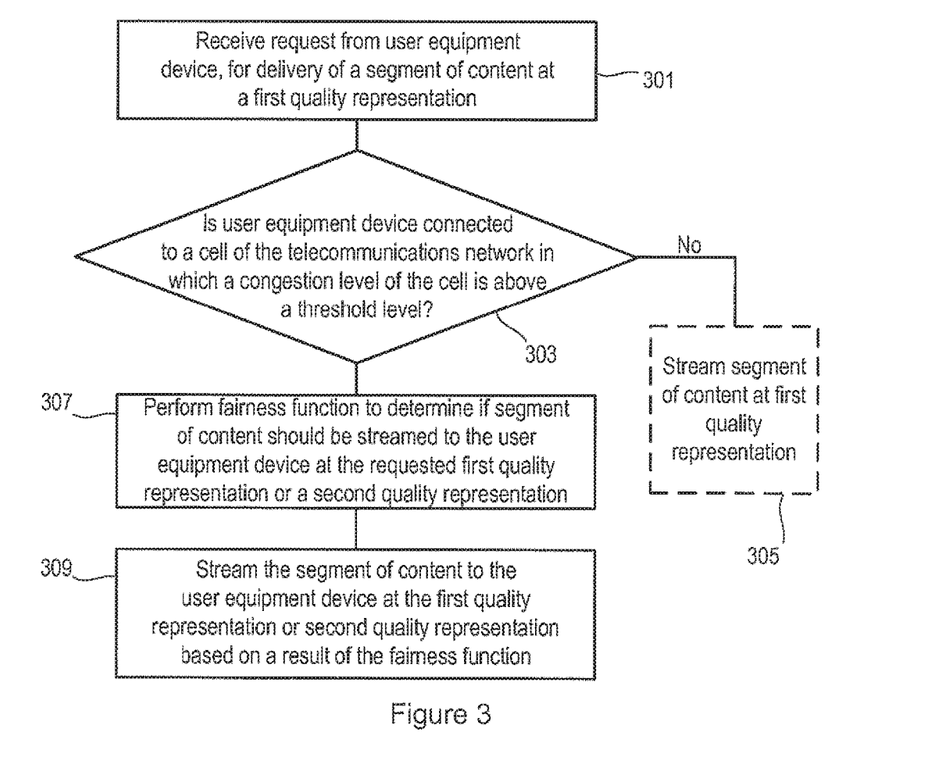
FIG. 3 shows a method according to a first embodiment of the present invention.

FIG. 3 shows a method according to a first embodiment of the invention, for streaming content to one or more user equipment devices in a telecommunications network, wherein the content is available for streaming at one of a plurality of different quality representations. The method comprises the step of receiving a request from a user equipment device, wherein the request is for delivery of a segment of the content at a first quality representation, step 301. In step 303 it is determined whether the user equipment device is connected to a cell of the telecommunications network in which a congestion level of the cell is above a threshold level. If so, in step 307 a fairness function is performed to determine if the segment of content should be streamed to the user equipment device at the requested first quality representation or a second quality representation. The segment of content is then streamed, step 309, to the user equipment device at the first quality representation or the second quality representation based on a result of performing the fairness function.

The quality representation may relate to one or more of a bitrate at which a segment of content is to be streamed, or a quality level at which a segment is to be streamed, or the resolution of a segment (such as SD or HD), or the size of a particular segment (also known as chunk size), or some other criteria that effects the fairness of how content is streamed to end users. A particular quality representation may also comprise some other feature that affects the bandwidth used for streaming content to an end user, or more generally to a "profile" that a client is bidding for in the streaming of content to that end user.

By determining if a request is from a user equipment device located in a congested cell, the method is able to perform an additional check before streaming the content to the user equipment device at its requested quality representation, this additional check being the fairness function. As such, the method does not merely accept a request made by a user equipment device and merely allow a request to be granted, for example in a situation whereby the same quality representation as a previous quality representation is still available for a given user equipment device, or where a higher quality representation is requested and is available. Instead, even if the system could, in theory, manage to grant the streaming of a segment at the same quality representation to a user equipment device as was requested by that user equipment device in a previous request, (or at a higher quality representation being requested by the user equipment device), the method performs a fairness test or function in a situation where the user equipment device is located or associated with a congested cell.

It is noted that the fairness function itself may comprise one or more steps for determining whether the particular user equipment device should receive content at the requested quality representation. For example, this may involve checking how long that particular user equipment device has been receiving content at the requested quality representation, or comparing such information with other user equipment devices associated with the same congested cell. This may involve monitoring historical communication to one or more user equipment devices connected to a particular congested cell, such as the type of quality representations and/or length of streaming at such quality representations to one or more user equipment devices over a given period.

The streaming of a segment of content may comprise the steps of streaming at the second quality representation for a predetermined period of time, or until it is determined that congestion in the associated cell has fallen below the threshold level.

According to one example the step of determining whether the user equipment device is connected to a cell that is congested may comprises the step of receiving a congestion signal, such as a throttle signal, with this congestion signal providing an indication regarding whether congestion in a cell associated with the user equipment device is above the threshold level. It is noted that other mechanisms may be used to indicate whether or not a particular cell is congested, for example based on different signals that different operators might use as their proprietary mechanisms to monitor congestion.

The congestion signal may comprise a list of identities of each user equipment device in each respective congested cell. In other words, when a particular cell becomes congested, a congested signal provides a list of each user equipment device connected to that congested cell. Alternatively, a request received from a user equipment device may comprise some form of indication to show whether or not the user equipment device is associated with a congested cell. In such a scenario the congestion signal is received as part of a communication signal from the user equipment device.

According to one embodiment, the congested signal is received from a monitoring node which is adapted to monitor the congestion within a cell. The monitoring node may form part of another node of the telecommunications network, such as part of a radio network controller. It is noted, however, that this monitoring of the congestion level to provide a congestion signal may be performed in any part of the network, including for example a server node which is adapted to stream the segments of content.

The method may further comprise the step of transmitting an information signal to the user equipment device when it is determined that the segment of content is to be streamed at the second quality representation. The information signal acts to inform the user equipment device that the segment of content is being transmitted at a quality representation that is different than the requested quality representation.

This has the advantage of enabling a user equipment device to become aware more readily that the content is not being received at the desired quality representation. The information signal can be used to adjust or adapt the functioning or operation of the user equipment device accordingly, and/or to inform the end user to expect a reduced quality of service.

The request for delivery of a segment of content can be an adaptive HTTP streaming (AHS) request signal, for example a "HTTP GET" request signal.

The information signal can be transmitted to the user equipment device in a HTTP message signal, for example a "Type 203" HTTP message signal.

As mentioned above, a quality representation may comprise one or more of a bitrate at which a segment of content is to be transmitted, the size of a segment of content to be streamed, or the resolution of the segment, such as SD or HD, or any of the other criteria mentioned above.

According to one embodiment the second quality representation comprises an inferior quality representation compared to the first quality representation, for example a lower bitrate compared to the bitrate of the first quality representation. This has the advantage of using less bandwidth than was requested by the user equipment device, which means that more bandwidth will be available in that cell for other user equipment devices which have been treated less fairly until that point.

Figure 4:
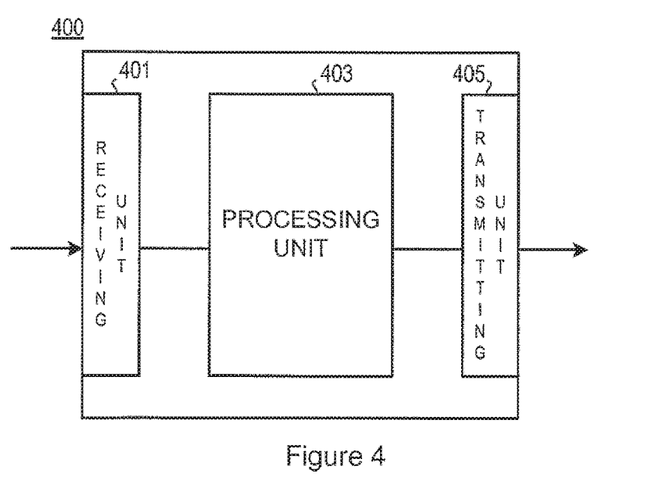
FIG. 4 shows an example of an apparatus according to an embodiment of the present invention.

FIG. 4 shows an apparatus 400 according to an embodiment of the present invention, for streaming content to one or more user equipment devices in a telecommunications network, wherein the content is available for streaming at one of a plurality of different quality representations. The apparatus 400 comprises a receiving unit 401 configured to receive a request from a user equipment device, wherein the request is for delivery of a segment of the content at a first quality representation. A processing unit 403 is adapted to determine whether the user equipment device is connected to a cell of the telecommunications network in which a congestion level of the cell is above a threshold level. If so, the processing unit 403 is adapted to perform a fairness function to determine if the segment of content should be streamed to the user equipment device at the requested first quality representation or a second quality representation. A transmitting unit 405 is configured to stream the segment of content to the user equipment device at the first quality representation or the second quality representation based on a result of the fairness function.

The transmitting unit 405 may be configured to stream at the second quality representation for a predetermined period of time, or until congestion in the associated cell has fallen below the threshold level.

According to one embodiment the processing unit 403 is may be coupled to receive a congestion signal, wherein the congestion signal provides an indication regarding whether congestion in a cell associated with the user equipment device is above the threshold level.

The congestion signal may comprises a list of identities of each user equipment device in each respective congested cell, or the other forms mentioned above in relation to the method of FIG. 3.

The transmitting unit 405 may be further adapted to transmit an information signal to a user equipment device when the processing unit 403 has determined that the segment of content is to be streamed at the second quality representation, informing the user equipment device that the segment of content is being transmitted at a quality representation that is different than the requested quality representation.

As mentioned above, a quality representation may comprise any one or more of a bitrate at which a segment of content is to be streamed by the transmitting unit, the size of a segment of content to be streamed, or the resolution of the segment, such as standard definition SD or high definition HD, or any of the other criteria mentioned in the embodiments above.

For example, the second quality representation may comprise an inferior quality representation compared to the first quality representation, or comprises a lower bitrate compared to the bitrate of the first quality representation.

From the above it can be seen that embodiments of the invention are based on receiving some form of "throttle information" or congestion signal, for example from a monitoring node, to decide if a fairness function shall be invoked. If the fairness function is invoked, adaptive HTTP streaming clients (user equipment devices) may have their video quality temporarily lowered to improve fairness between clients.

The embodiments also describe how the method signals to the affected adaptive HTTP streaming clients that the video quality the client requested has been lowered. The client may use this information in a number of ways. For example, to adjust its internal AHS logic/algorithms according to the video quality characteristics the client has actually received, and/or to inform the end-user that the video quality has been lowered due to cell congestion.

The embodiments of the invention are intended to embrace any form of fairness function being used, and can include a number of different "fairness" algorithms.

Figure 5:
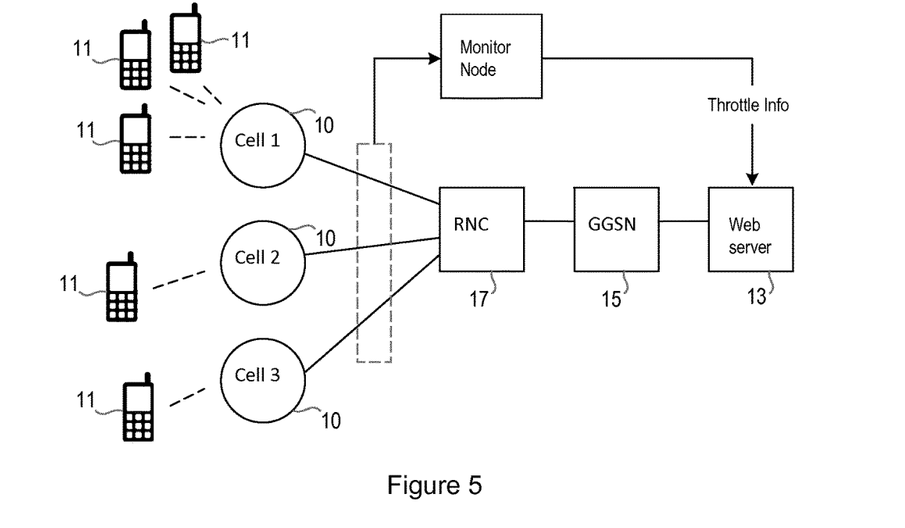
FIG. 5 shows an example of a network in which embodiments of the present invention may be used.

FIG. 5 shows a high level overview of a radio communication network that is adapted to include an embodiment of the present invention. The network comprises a plurality of cells 10, each cell communicating with one or more associated user equipment devices 11. A server node, such as a web server node 13 is configured to serve the user equipment devices with adaptive HTTP streamed segments of content, such as segments of video or media. In the example the web server node streams the content via a Gateway GPRS Support Node (GGSN) 15, and under control of a radio network controller 17. It will be appreciated that the invention may involve streaming content via one or more other nodes, or using different communication links. Typically an adaptive HTTP streaming request from a client is a standard HTTP GET request, for example, towards a vanilla web server which serves the client with the video chunk of the requested quality.

A monitoring node is adapted to monitor the different cells 10 in the network and provide a congestion signal when congestion in a cell is above a threshold level, indicating that the cell is congested. Different operators may use different signals for indicating congestion. The congestion signal therefore provides a signal, for example to an operator or to the system configured to perform a fairness function, when a cell is getting full (the bandwidth being fully occupied, or nearing full occupancy). It is noted that the invention is intended to embrace any type of monitoring node being used to perform this function of determining whether or not a particular cell is congested. The monitoring node may form part of a stand alone node, or part of another node, including being part of the node adapted to perform the fairness function itself.

Figure 6:
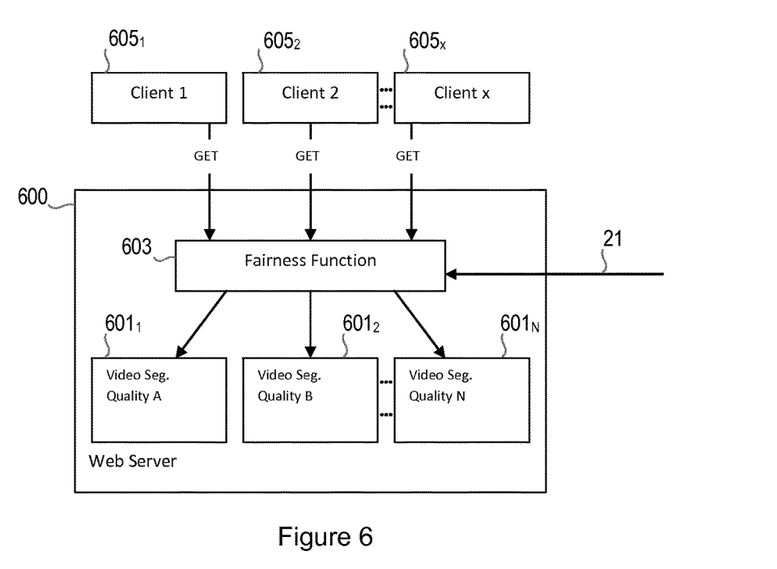
FIG. 6 shows an example of an apparatus according to another embodiment of the present invention.

FIG. 6 shows a server node 600 according to an embodiment of the invention, which is configured to stream content to one or more client devices (user equipment devices) $605_1$ to $605_x$. The server node 600 is capable of streaming content at any one of a number of different quality representations $601_1$ to $601_N$ (for example "Video Segment—Quality A", "Video Segment—Quality B", "Video Segment—Quality N"). As mentioned above, a quality representation may comprise a particular bitrate, and any of the other examples noted earlier in the application. Requests for streaming segments of content at one of these quality representations $601_1$ to $601_N$ are received from user equipment devices $605_1$ to $605_x$. The server node 600 is adapted to perform a fairness function 603 on any request that is received from a user equipment device $605_1$ to $605_x$ which is associated with a congested cell. This is determined based on a congestion signal 21 received at the server node 600.

The fairness function 603 is therefore effectively placed between the video segments and the clients. It is noted that the server node 600 may comprise any number of video segments $601_1$ to $601_N$, and more than one video resource (e.g. movie) is of course also normally available.

The fairness function 603 can be configured to keep track of all different concurrent connections from adaptive HTTP streaming clients $605_1$ to $605_x$. The fairness function 603 can be adapted to processes cell information data and apply a fair scheduling algorithm to the adapting HTTP streaming clients that are part of a congested cell. For adaptive HTTP streaming clients that are not part of a congested cell the fairness function 603 can be configured to take no action.

Depending on which type of monitoring node that is used to obtain a congestion signal, the details of the throttle info data may vary, but all types of monitoring nodes provide the basic information set needed by the fairness function 603.

For example, this may comprise a list of all the congested cells in the network and information about which clients belong to each of these cells, these clients being the ones that must have their video quality "throttled", hence the term "throttle information".

Table 1 below shows an example of a list of congested cells, which may form part of a congestion signal.

TABLE 1

| Cell id | Cell clients (MSISDN, simplified) |
|---|---|
| 1 | 423, 54, 65, 094, 387 |
| 8 | 189, 67, 565, 99, 378632, 76736 |
| 13 | 23, 65, 09, 57, 978, 283, 439, 82 |

An algorithm may be used to schedule the resources between adaptive HTTP streaming clients in a congested cell, and may be defined in many different ways, from very simple to very complex. The embodiments of the invention are intended to embrace any such algorithm.

In all of the embodiments mentioned herein, it is noted that the different quality representations that are available for a user equipment device to request, may be notified to a user equipment device using a manifest file, for example, during an initial communication between the user equipment device and the server node that streams segments of content.

Figure 7:
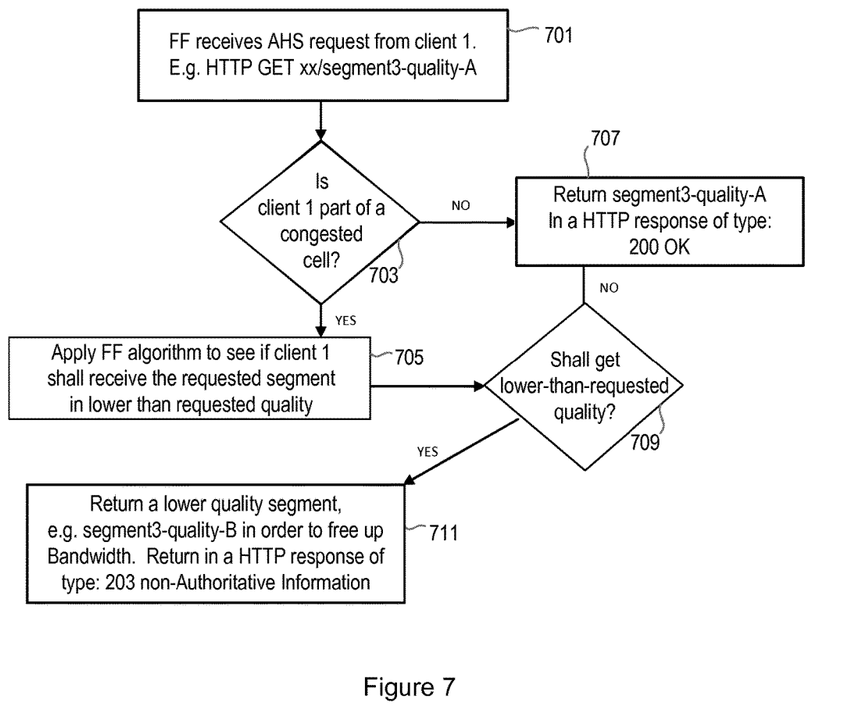
FIG. 7 shows a method according to another embodiment of the present invention.

FIG. 7 shows a method performed by another embodiment of the invention. In step 701 a fairness function receives an adapting HTTP streaming request signal from a first client or user equipment device, for example HTTP GET xx/segment3-quality-A". In step 703 it is determined whether the first client is part of a congested cell (and that the request was therefore received from a client device from a congested cell). If not, then in step 707 a segment is returned at the requested quality, for example returning segment3-quality-A, for example in a HTTP response of type "200 OK".

However, if it is determined in step 703 that the request is from a client in a congested cell, the fairness function is applied in step 705, to determine of the first client should receive the requested segment at a different quality, such as a lower quality than the requested quality (rather than receiving at the requested quality). If it is determined in step 709 that the first client should get a lower than requested quality, then in step 711 a lower quality segment is returned, for example segment3-qualityB, in order to free up bandwidth. An information signal may also be sent, for example in a HTTP response of type 203, non-authoritative information, indicating that the segment is being returned at a lower quality. If is determined in step 709 that the client should not get a lower than requested quality, then the segment is returned at the requested quality, step 707.

This shows the response alternatives towards the requesting client. If no quality adjustment is necessary the requested quality is returned in a HTTP 200 OK response according to standard AHS behavior. If a quality adjustment is needed, based on the fairness function determination, another (for example one step lower) quality than what was requested is returned to the client. Since adaptive HTTP streaming clients typically are assuming that the requested quality is also returned, and are using this fact in their local algorithms, they are preferably informed that a lower quality is being returned. This information is transferred by returning the request in a HTTP 203 (Non-Authoritative Information) instead of a 200 OK. When the client receives a HTTP 203 response it knows that instead of using the requested quality in its calculations it shall use a lower quality, such as a one step lower quality.

It is noted that the 203 type response is one example way of signaling the forced video quality switch-down to the client. However other HTTP response codes, or custom HTTP headers together with a 200 OK, are also intended to be embraced by embodiments of the invention.

When a user equipment device or client receives the 203 response (or equivalent information using alternative signaling) it knows that it should adjust the video quality (e.g. bitrate) used in its local algorithms (as described above). The client can also use this information to display a notification to the end-user along the lines: "You are currently in an area with much mobile traffic; you may experience a slightly decreased video quality". Such information is very valuable since end-users are much more likely to accept lower quality of a service if they are informed about the underlying reason.

As mentioned above, the embodiments of the invention are intended to cover any form of fairness function being applied to determine if a requested quality representation should be granted. The following example is given to help illustrate this.

Consider three quality levels of video listed in the AHS manifest file: Level A (highest), Level B, Level C (lowest). The fairness function has access to the manifest and knows about these levels. Now the fairness function starts to receive requests from different clients. For each request it checks the identity, for example the MSISDN, to understand which client made the request and check which cell the client belongs to by verifying against the Cell Info data, for example. If the client is part of a non-congested cell no further action is taken and the requested quality is returned.

If the client is part of a congested cell and requests level A quality, the fairness function will be performed, and if necessary decide to return a lower quality, for example level B quality instead. This process can be performed each time a new request is received. Alternatively, the streaming at a lower quality can continue until either the congestion is relieved or until a certain time period has elapsed. During this time period, level A requests will continue to be lowered to level B but level B requests will also be lowered to level C.

Figure 8:
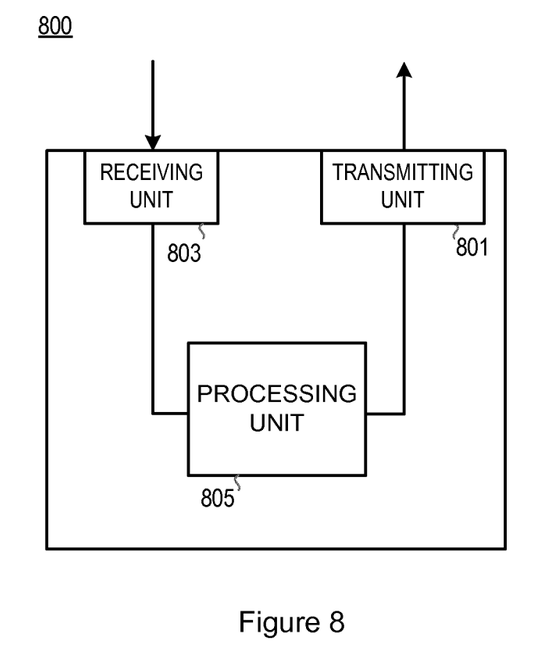
FIG. 8 shows a user equipment device according to an embodiment of the present invention.

FIG. 8 relates to a user equipment device 800 according to another embodiment of the invention, for receiving content from a node of a telecommunications network, wherein the content is available for streaming from the node at one of a plurality of different quality representations. The user equipment device 800 comprises a transmitting unit 801 adapted to transmit a request for receipt of a segment of the content at a first quality representation. A receiving unit 803 is adapted to receive an information signal from the node, wherein the information signal contains an indicator that the requested segment of content is being received at a different quality representation to that requested. A processing unit 805 is adapted to adjust the operation of the user equipment device to receive the segment of content at the second quality representation.

As such, when a user equipment device has requested the streaming of content from a remote node at a particular quality representation, such as a particular bitrate, and the remote node (or another node associated with the remote node) determines that it is not fair to stream to the user equipment device at that quality representation, then the user equipment device will receive an information signal which indicates that the requested segment of content is being received at a different quality representation to that requested. It is noted that segment of content and the information signal may be received in any order, or concurrently.

The processing unit 805 may be further adapted to inform a user of the user equipment device that the content is being received at a different quality representation to the requested quality representation.

The embodiments of the invention provide an advantage in that they allow operators to address the AHS unfairness problem without the need to affect the network in any way. Service providers only need to introduce a component in their own server side domain which they have full control over.

Another advantage is that the invention enables a AHS client to inform the end-user about the reason (cell congestion) for temporarily lowered video quality.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for transmitting content to one or more user equipment devices in a telecommunications network, wherein the content is available for transmitting at one of a plurality of different quality representations, the method comprising the steps of:
receiving a request from a user equipment device, wherein the request is for delivery of a segment of the content at a first quality representation;
determining whether the user equipment device is connected to a cell of the telecommunications network in which a congestion level of the cell is above a threshold level; and
as a result of determining that the user equipment device is connected to a cell in which congestion level of the cell is above a threshold level, further performing the steps of:
choosing, using a fairness function, from a set of two or more available quality representations, a quality representation at which the segment of content should be streamed to the user equipment device, wherein the set of available quality representations comprises the requested first quality representation and a second quality representation that is different than the first quality representation; and
transmitting the segment of content to the user equipment device at the chosen quality representation, wherein
the step of choosing the quality representation at which the segment of content should be streamed to the user equipment device using the fairness function comprises:
determining a first length of time during which the user equipment device has been receiving content at a requested quality representation;
determining a second length of time during which a second user equipment device has been receiving content at a requested quality representation;
determining that the first length of time exceeds the second length of time; and
as a result of determining that the first length of time exceeds the second length of time, choosing the second quality representation.

2. The method as claimed in claim 1, wherein the step of choosing the quality representation comprises determining whether a certain time period has elapsed.

3. The method as claimed in claim 1, wherein the step of determining whether the user equipment device is connected to a cell that is congested comprises the step of receiving a congestion signal, wherein the congestion signal provides an indication regarding whether congestion in a cell associated with the user equipment device is above the threshold level.

4. The method as claimed in claim 3, wherein the congestion signal comprises a list of identities of each user equipment device in each respective congested cell.

5. The method as claimed in claim 1, further comprising the step of transmitting an information signal to the user equipment device when it is determined that the segment of content is to be streamed at the second quality representation, informing the user equipment device that the segment of content is being transmitted at a quality representation that is different than the requested quality representation.

6. The method as claimed in claim 1, wherein the request for delivery of a segment of content is an adaptive HTTP streaming, AHS, request signal, or a HTTP GET request signal.

7. The method as claimed in claim 5, wherein the information signal is transmitted to the user equipment device in a HTTP message signal, or a Type 203 HTTP message signal.

8. The method as claimed in claim 1, wherein a quality representation comprises one or more of a bitrate at which a segment of content is to be transmitted, the size of a segment of content to be streamed, or a standard definition, SD, or high definition, HD, at which the segment of content is to be steamed.

9. The method as claimed in claim 8, wherein the second quality representation comprises an inferior quality representation compared to the first quality representation, or comprises a lower bitrate compared to the bitrate of the first quality representation.

10. An apparatus for transmitting content to one or more user equipment devices in a telecommunications network, wherein the content is available for transmitting at one of a plurality of different quality representations, the apparatus comprising:

a receiver for receiving a request from a user equipment device, wherein the request is for delivery of a segment of the content at a first quality representation;

a processing unit adapted to determine whether the user equipment device is connected to a cell of the telecommunications network in which a congestion level of the cell is above a threshold level, and, if so, choose, using a fairness function, from a set of two or more available quality representations, a quality representation at which the segment of content should be streamed to the user equipment device, wherein the set of available quality representations comprises the requested first quality representation and a second quality representation that is different than the first quality representation; and a transmitter for transmitting the segment of content to the user equipment device at the chosen quality representation, wherein the processing unit is adapted to choose the quality representation at which the segment of content should be streamed to the user equipment device using the fairness function by performing a process comprising:

determining a first length of time during which the user equipment device has been receiving content at a requested quality representation;

determining a second length of time during which a second user equipment device has been receiving content at a requested quality representation;

determining that the first length of time exceeds the second length of time; and as a result of determining that the first length of time exceeds the second length of time, choosing the second quality representation.

11. The apparatus as claimed in claim 10, wherein the processing unit is configured such that it chooses the quality representation based on whether a certain time period has elapsed.

12. The apparatus as claimed in claim 10, wherein the processing unit is coupled to receive a congestion signal, wherein the congestion signal provides an indication regarding whether congestion in a cell associated with the user equipment device is above the threshold level.

13. The apparatus as claimed in claim 12, wherein the congestion signal comprises a list of identities of each user equipment device in each respective congested cell.

14. The apparatus as claimed in claim 10, wherein the transmitter is further adapted to transmit an information signal to the user equipment device when the processing unit has determined that the segment of content is to be streamed at the second quality representation, informing the user equipment device that the segment of content is being transmitted at a quality representation that is different than the requested quality representation.

15. The apparatus as claimed in claim 10, wherein a quality representation comprises one or more of a bitrate at which a segment of content is to be streamed by the transmitter, the size of a segment of content to be streamed, or a standard definition, SD, or high definition, HD, at which the segment of content is to be steamed.

16. The apparatus as claimed in claim 15, wherein the second quality representation comprises an inferior quality representation compared to the first quality representation, or comprises a lower bitrate compared to the bitrate of the first quality representation.

* * * * *